United States Patent
Hashimoto et al.

(10) Patent No.: US 9,431,833 B2
(45) Date of Patent: Aug. 30, 2016

(54) BATTERY SYSTEMS AND REMAINING CAPACITY MANAGEMENT SYSTEMS FOR SECONDARY BATTERY

(75) Inventors: Yoichi Hashimoto, Kanagawa (JP); Hiroaki Ueno, Kanagawa (JP)

(73) Assignee: NEC ENERGY DEVICES, LTD., Kanagawa (JP)

(*) Notice: Subject to any disclaimer, the term of this patent is extended or adjusted under 35 U.S.C. 154(b) by 283 days.

(21) Appl. No.: 14/131,571

(22) PCT Filed: Jun. 7, 2012

(86) PCT No.: PCT/JP2012/064678
§ 371 (c)(1),
(2), (4) Date: Jan. 8, 2014

(87) PCT Pub. No.: WO2013/011766
PCT Pub. Date: Jan. 24, 2013

(65) Prior Publication Data
US 2014/0152267 A1 Jun. 5, 2014

(30) Foreign Application Priority Data
Jul. 15, 2011 (JP) .................. 2011-156850

(51) Int. Cl.
*H02J 7/00* (2006.01)
*H01M 10/48* (2006.01)
*H01M 10/42* (2006.01)

(52) U.S. Cl.
CPC ............ *H02J 7/0029* (2013.01); *H01M 10/48* (2013.01); *H02J 7/0047* (2013.01); *H01M 2010/4271* (2013.01); *H01M 2010/4278* (2013.01); *H01M 2200/00* (2013.01); *H02J 2007/005* (2013.01)

(58) Field of Classification Search
USPC ........................................................ 320/134
See application file for complete search history.

(56) References Cited

U.S. PATENT DOCUMENTS

2007/0188148 A1  8/2007  Kawasumi et al.
2010/0213891 A1* 8/2010  Nishikawa ............ H01M 10/42
                                                320/106

FOREIGN PATENT DOCUMENTS

EP  1892791 A1  2/2008
JP  2010-191880 A  9/2010
JP  2011-108439 A  6/2011

OTHER PUBLICATIONS

Communication dated Mar. 25, 2015 from the European Patent Office in counterpart European Application No. 12814752.7.

* cited by examiner

*Primary Examiner* — Robert Grant
(74) *Attorney, Agent, or Firm* — Sughrue Mion, PLLC

(57) ABSTRACT

A battery system according to the present invention includes a secondary battery; a battery control unit that controls charging and discharging of said secondary battery; and a charging/discharging management unit that controls the charging and discharging of said secondary battery through said battery control unit, wherein said battery control unit, if an abnormality occurred during operation of said battery control unit, transmits remaining capacity data that represent a remaining capacity of said secondary battery that remained immediately before the abnormality occurred to said charging/discharging management unit.

7 Claims, 3 Drawing Sheets

BATTERY SYSTEMS AND REMAINING CAPACITY MANAGEMENT SYSTEMS FOR SECONDARY BATTERY

CROSS REFERENCE TO RELATED APPLICATIONS

This application is a National Stage of International Application PCT/JP2012/064678, filed on Jun. 7, 2012, claiming priority based on Japanese Patent Application No. JP 2011-156850, filed Jul. 15, 2011, the content of all of which are incorporated herein by reference in their entirety.

TECHNICAL FIELD

The present invention relates to techniques that manage the remaining capacity of a secondary battery.

BACKGROUND ART

In a battery system, a charging/discharging management unit controls charging and discharging of a secondary battery such as a lithium ion secondary battery through a battery control unit (BMU: Battery Management Unit).

If an abnormality occurs during the operation of the battery control unit of the battery system, a constituent element in which the abnormality has occurred is reset. For example, Patent Literature 1 discloses a technique that resets a communication unit that communicates with a device if the communication state with the device is lost. In addition, Patent Literature 1 discloses another technique that cumulates the charged/discharged current of the secondary battery while it is normally operated and calculates the remaining capacity of the secondary battery based on the cumulative capacity.

RELATED ART LITERATURE

Patent Literature

Patent Literature 1: JP2011-108439A, Publication

SUMMARY OF THE INVENTION

Problem to be Solved by the Invention

However, if an abnormality occurs during the operation of the battery control unit and thereby the charging/discharging management unit resets the battery control unit, the battery control unit that has been reset cannot accurately know the cumulative capacity and the remaining capacity of the secondary battery that occurred before the battery control unit was reset.

Thus, when the secondary battery is charged or discharged after the battery control unit has been reset, the remaining capacity data of the secondary battery calculated by the battery control unit will not match the actual charged/discharged current of the secondary battery.

Therefore, an object of the present invention is to provide a battery system and a remaining capacity management method for a secondary battery that allow the remaining capacity data of the secondary battery to be kept as close to an accurate value as possible when the battery control unit is charged or discharged after it has been restored from an abnormality that had occurred therein.

Means that Solve the Problem

A battery system according to the present invention includes:
a secondary battery;
a battery control unit that controls charging and discharging of said secondary battery; and
a charging/discharging management unit that controls the charging and discharging of said secondary battery through said battery control unit,
wherein said battery control unit, if an abnormality occurred during operation of said battery control unit, transmits remaining capacity data that represent a remaining capacity of said secondary battery that remained immediately before the abnormality occurred to said charging/discharging management unit.

A remaining capacity management method of a secondary battery according to the present invention is a remaining capacity management method of secondary battery for a battery system having a secondary battery; a battery control unit that controls charging and discharging of said secondary battery; and a charging/discharging management unit that controls the charging and discharging of said secondary battery through said battery control unit, the method including:
if an abnormality occurred during operation of said battery control unit, causing said battery control unit to transmit remaining capacity data that represent a remaining capacity of said secondary battery that remained immediately before the abnormality occurred.

Effect of the Invention

According to the present invention, the remaining capacity data that represent the remaining capacity of the secondary battery and that are written to the battery control unit when the battery control unit is restarted by the charging/discharging management unit can be kept as close to an accurate value as possible.

Thus, when the secondary battery is charged or discharged after the battery control unit is restarted, the remaining capacity data of the secondary battery can be kept as close to an accurate value as possible.

BEST MODES THAT CARRY OUT THE INVENTION

Next, with reference to the accompanying drawings, exemplary embodiments of the present invention will be described.

(1) First Exemplary Embodiment

First, with reference to FIG. 1, the structure of a battery system according to a first exemplary embodiment of the present invention will be described.

Figure 1:
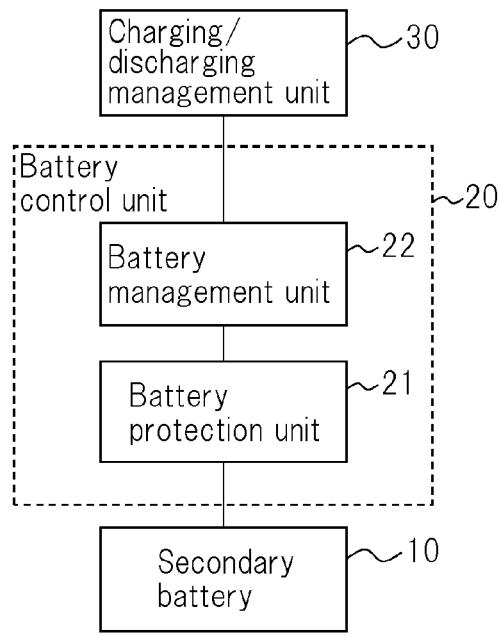
FIG. 1 is a block diagram showing the structure of a battery system according to a first exemplary embodiment of the present invention.

As shown in FIG. 1, the battery system according to this exemplary embodiment has secondary battery 10, battery control unit 20, and charging/discharging management unit 30.

Battery control unit 20 controls charging and discharging of secondary battery 10.

Charging/discharging management unit 30 causes battery control unit 20 to charge and discharge secondary battery 10.

Specifically, when secondary battery 10 is charged, charging/discharging management unit 30 causes battery control unit 20 to supply electricity supplied from a power supply (not shown) to secondary battery 10 in order to charge it.

When secondary battery 10 is discharged (namely, the source of electricity supplied to a device (not shown) is secondary battery 10), charging/discharging management unit 30 causes battery control unit 20 to discharge secondary battery 10 in order to supply the discharged electricity to the device.

When the power source for the device is a commercial power supply, charging/discharging management unit 30 causes electric power of the commercial power supply to be supplied to the device.

Battery control unit 20 has battery protection unit (A-BMU: Analog-BMU) 21 and battery management unit (D-BMU: Digital-BMU) 22.

Battery protection unit 21 monitors whether or not an abnormality such as overcharging, overdischarging, overcurrent, or overheating has occurred in secondary battery 10. If battery protection unit 21 detects an abnormality, battery protection unit 21 stops charging or discharging of secondary battery 10 in order to protect it. Such abnormalities are detected using sensors such as a voltmeter, a clone counter, and a thermistor (not shown). If battery protection unit 21 detects an abnormality, battery protection unit 21 turns off a charging/discharging switch (not shown) located on a charging/discharging path of secondary battery 10 in order to stop charging or discharging of secondary battery 10.

Battery management unit 22 controls charging and discharging of secondary battery 10 through battery protection unit 21.

Specifically, battery management unit 22 causes secondary battery 10 to charge or discharge electricity under the control of charging/discharging management unit 30.

Here, with reference to FIG. 2, the structure of battery management unit 22 will be described.

Figure 2:
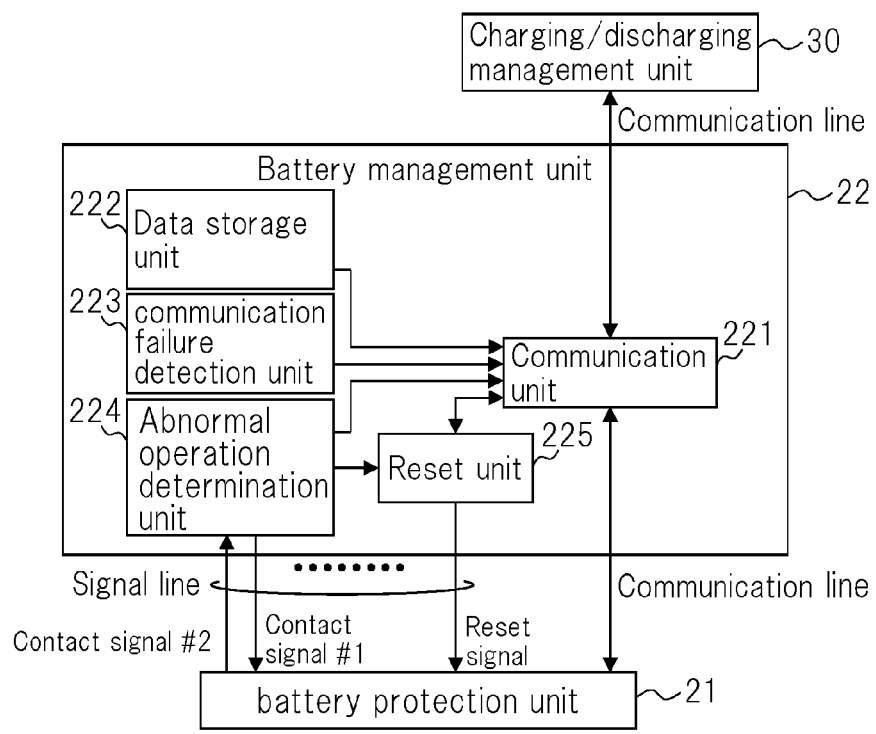
FIG. 2 is a block diagram showing the structure of a battery management unit shown in FIG. 1.

As shown in FIG. 2, battery management unit 22 has communication unit 221, data storage unit 222, communication failure detection unit 223, abnormal operation determination unit 224, and reset unit 225 that is an initialization unit.

FIG. 2 shows only constituent elements of battery management unit 22 as features of the present invention. In FIG. 2, power lines (not shown) are respectively located between charging/discharging management unit 30 and battery management unit 22 and between battery management unit 22 and battery protection unit 21. In addition, a power line (not shown) is also located between battery protection unit 21 and secondary battery 10.

Communication unit 221 transmits and receives data and commands between charging/discharging management unit 30 and battery protection unit 21 through a communication line.

Since communication unit 221 according to this exemplary embodiment transmits and receives data and commands according to the RS-485 standard that uses differential serial communication lines, data and commands that are transmitted and received have high noise resistance. In addition, data that are transmitted and received contain an alarm bit that represents abnormalities of secondary battery 10 detected by battery protection unit 21. Battery protection unit 21 notifies charging/discharging management unit 30 of an abnormality such as overcharging, overdischarging, overcurrent, or overheating based on the alarm bit that is turned on or off. In addition, alarm signal lines (not shown) are located between any two of battery management unit 22, charging/discharging management unit 30, and battery protection unit 21. Charging/discharging management unit 30 is notified of the alarm bit through the alarm signal lines. As a result, the reliability of charging/discharging management unit 30 that manages charging/discharging abnormalities is improved.

Data storage unit 222 stores the remaining capacity data of secondary battery 10 for battery protection unit 21. Battery protection unit 21 always monitors the remaining capacity data of secondary battery 10. According to this exemplary embodiment, the remaining capacity data are calculated by subtracting the discharged cumulative capacity of discharged current in secondary battery 10 from the fully charged capacity of secondary battery 10.

Thus, according to this exemplary embodiment, communication unit 221 always obtains the remaining capacity data of secondary battery 10 from battery protection unit 21 and stores the obtained remaining capacity data in data storage unit 222. It is assumed that if an abnormality has occurred during the operation of battery protection unit 21, the remaining capacity data, that have remained immediately before the abnormality has occurred, have been stored in data storage unit 222.

Communication failure detection unit 223 detects a failure that has occurred in the communication between communication unit 221 and battery protection unit 21. Alternatively, communication failure detection unit 223 may detect a failure that has occurred in the communication between communication unit 221 and charging/discharging management unit 30.

If communication failure detection unit 223 detects a failure that has occurred in the communication between communication unit 221 and battery protection unit 21, abnormal operation determination unit 224 determines whether or not an abnormality has occurred during the operation of battery protection unit 21.

If abnormal operation determination unit 224 has determined that an abnormality had occurred during the operation of battery protection unit 21, communication unit 221 reads the remaining capacity data that had remained immediately before the abnormality had occurred during the operation of battery protection unit 21 from data storage unit 222 and transmits the obtained remaining capacity data to charging/discharging management unit 30.

If abnormal operation determination unit 224 has determined that an abnormality had occurred during the operation of battery protection unit 21, reset unit 225 transmits a reset permission request to charging/discharging management unit 30 through communication unit 221 in order to reset battery protection unit 21.

When reset unit 225 receives a reset permission notification from charging/discharging management unit 30, reset unit 225 resets battery protection unit 21 in order to initialize it. At this point, reset unit 225 receives the reset permission notification from charging/discharging management unit 30 through communication unit 221. In addition, reset unit 225 transmits a reset signal to battery protection unit 21.

Next, with reference to FIG. 3, the operation of the battery system according to this exemplary embodiment will be described.

Figure 3:
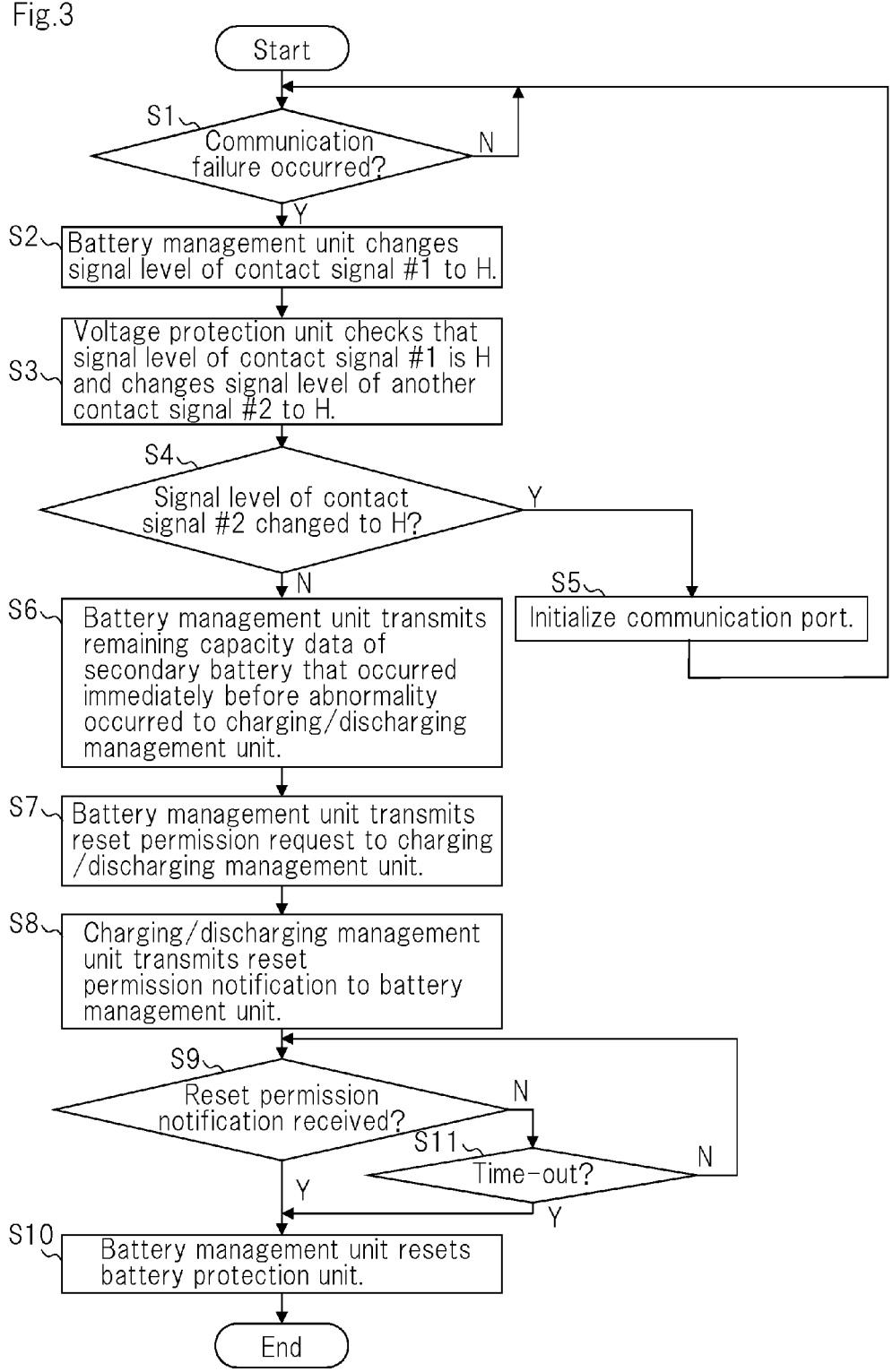
FIG. 3 is a flow chart describing the operation of the battery system shown in FIG. 1.

As shown in FIG. 3, if communication failure detection unit 223 has detected a failure in the communication between communication unit 221 and battery protection unit 21 (at step S1), abnormal operation determination unit 224 causes the signal level of contact signal #1 to change from Low to High (at step S2). In FIG. 3, "Y" denotes Yes and "N" denotes No.

Thereafter, battery protection unit 21 checks that the signal level of contact signal #1 has changed from Low to High and then causes the signal level of another contact signal #2 to change from Low to High (at step S3).

Thereafter, abnormal operation determination unit 224 checks whether or not the signal level of contact signal #2 has changed from Low to High (at step S4).

If contact signal #2 has changed to High at step S4 (Yes at step S4), abnormal operation determination unit 224 determines that battery protection unit 21 is operating, initializes the communication port on battery protection unit 21 side of communication unit 221, and then returns to step S1.

In contrast, if contact signal #2 has not changed to High after contact signal has changed to High and then a predetermined period (for example, X seconds) has elapsed at step S4 (No at step S4), abnormal operation determination unit 224 will determine that an abnormality has occurred during the operation of battery protection unit 21. In this case, communication unit 221 will read the remaining capacity data of secondary battery 10 that remained immediately before the abnormality occurred during the operation of battery protection unit 21 from data storage unit 222 and transmit the obtained remaining capacity data to charging/discharging management unit 30 (at step S6). In addition, reset unit 225 will transmit the reset permission request to charging/discharging management unit 30 through communication unit 221 in order to reset battery protection unit 21 (at step S7).

When charging/discharging management unit 30 has received the reset permission request, if charging/discharging management unit 30 has received the remaining capacity data of secondary battery 10 that had remained immediately before the abnormality had occurred during the operation of battery protection unit 21 or after charging/discharging management unit 30 has received the reset permission request, if it receives the remaining capacity data, it will transmit a reset permission notification to battery management unit 22 in reply to the reset permission request in order to reset battery protection unit 21 (at step S8).

Thereafter, reset unit 225 checks whether or not communication unit 221 has received the reset permission notification from charging/discharging management unit 30 (at step S9).

If communication unit 221 has received the reset permission notification at step S9 (Yes at step S9), reset unit 225 will reset battery protection unit 21 (at step S10).

In contrast, if communication unit 221 has not received the reset permission notification at step S9 (No at step S9), as long as reset unit 225 has transmitted the reset permission request and a predetermined period has elapsed (for example, Y seconds) (Yes at step S11), reset unit 225 will reset battery protection unit 21 (at step S10).

As a result, if an abnormality has occurred during the operation of battery protection unit 21, before reset unit 225 has reset battery protection unit 21, charging/discharging management unit 30 can obtain the remaining capacity data of secondary battery 10 that had remained immediately before the abnormality had occurred during the operation of battery protection unit 21.

Thus, when charging/discharging management unit 30 restarts battery control unit 20, charging/discharging management unit 30 can write the remaining capacity data of secondary battery 10 that have remained immediately before an abnormality has occurred during the operation of battery protection unit 21 to both battery protection unit 21 and battery management unit 22.

Thus, the remaining capacity data of secondary battery 10 that are written to battery control unit 20 when it is restarted can be kept as close to an accurate value as possible.

(2) Second Exemplary Embodiment

In the battery system according to the first exemplary embodiment, one battery protection unit 21 is connected to battery management unit 22 (single parallel connection).

Figure 4:
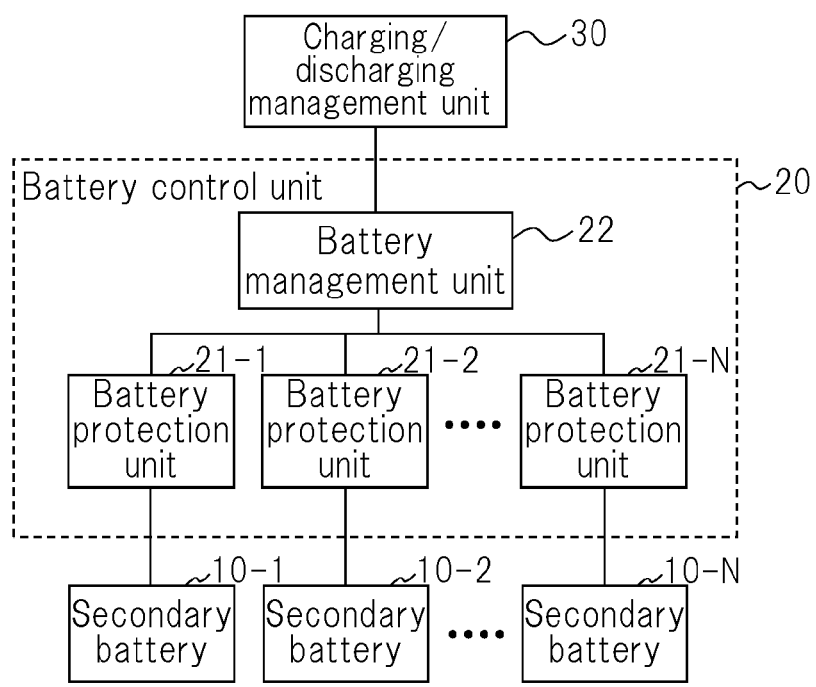
FIG. 4 is a block diagram showing the structure of a battery system according to a second exemplary embodiment of the present invention.

By contrast, in a battery system according to a second exemplary embodiment of the present invention, as shown in FIG. 4, N (where N is any natural number greater than 1) battery protection units 21-1 to 21-N are connected in parallel with battery management unit 22 (many parallel connections). Battery protection units 21-1 to 21-N monitor and protect secondary batteries 10-1 to 10-N, respectively.

According to this exemplary embodiment, battery management unit 22 monitors each of battery protection units 21-1 to 21-N. If a failure occurs in the communication between battery management unit 22 and any one of battery protection units 21-1 to 21-N, the operation shown in FIG. 3 will be performed for battery protection unit 21 which experienced the failure.

According to this exemplary embodiment, each of battery protection units 21-1 to 21-N may be provided with the constituent elements of battery management unit 22 shown in FIG. 2. Alternatively, the constituent elements of battery management unit 22 shown in FIG. 2 may control all of battery protection units 21-1 to 21-N.

The present invention has been described with reference to the exemplary embodiments. However, it should be understood by those skilled in the art that the structure and details of the present invention may be changed in various manners without departing from the scope of the present invention.

For example, according to each of the foregoing exemplary embodiments, battery protection unit 21 in which an abnormality has occurred is reset. Alternatively, since battery protection unit 21 in which an abnormality has occurred needs to be initialized, it may be, for example, turned off or preset, but not reset.

According to each of the foregoing exemplary embodiments, abnormal operation determination unit 224 and charging/discharging management unit 30 change the signal levels of contact signals #1 and #2 from Low to High. Although data storage unit 222 and charging/discharging management unit 30 need to change the signal levels of contact signals #1 and #2, signal levels may be changed from High to Low.

According to each of the foregoing exemplary embodiments, communication unit 221 always obtains the remaining capacity data of the secondary battery from battery protection unit 21 and stores the obtained remaining capacity data in data storage unit 222 such that the remaining capacity data of the secondary battery that remained immediately before an abnormality occurred during the operation of battery protection unit 21 are read from data storage unit 222. However, it should be appreciated that the present invention is not limited to such exemplary embodiments.

For example, communication unit 221 may obtain the remaining capacity data of the secondary battery from battery protection unit 21 at intervals of a predetermined period and stores the obtained remaining capacity data to data storage unit 222 such that if an abnormality occurs during the operation of battery protection unit 21, the remaining capacity data of the secondary battery that were stored in data storage unit 222 immediately before the abnormality occurred during the operation of data storage unit 222 are read and the remaining capacity data of the secondary battery that remained immediately before the abnormality occurred during the operation of battery protection unit 21 are calculated based on the remaining capacity data of the secondary battery that have been obtained and the current that flows in the secondary battery that has been monitored thereafter. In this case, the effect of the present invention in which the remaining capacity data of the secondary battery that are written to battery control unit 20 when it is restarted can be kept as close to an accurate value as possible.

The present application claims priority based on Japanese Patent Application JP 2011-156850 filed on Jul. 15, 2011, the entire contents of which are incorporated herein by reference in its entirety.

The invention claimed is:

1. A battery system, comprising:
a secondary battery;
a battery control unit that controls charging and discharging of said secondary battery; and
a charging/discharging management unit that controls the charging and discharging of said secondary battery through said battery control unit,
wherein, if an abnormal operation occurs in the inner portion of said battery control unit, said battery control unit transmits remaining capacity data that represent a remaining capacity of said secondary battery that remains immediately before the abnormal operation occurs, to said charging/discharging management unit,
wherein said battery control unit includes:
a battery protection unit that protects said secondary battery, and
a battery management unit that controls the charging and discharging of said secondary battery through said battery protection unit,
wherein said battery management unit includes:
an abnormal operation determination unit that determines whether or not an abnormal operation occurs in said battery protection unit; and
a communication unit that, if the abnormal operation occurs in said battery protection unit, transmits said remaining capacity data of said secondary battery, that remains immediately before the abnormal operation occurs, to said charging/discharging management unit.

2. The battery system as set forth in claim 1,
wherein said battery management unit further includes:
an initialization unit that transmits an initialization permission request to said charging/discharging management unit through said communication unit if the abnormal operation occurs in said battery protection unit and said initialization unit initializes said battery protection unit if said communication unit receives an initialization permission notification from said charging/discharging management unit.

3. The battery system as set forth in claim 2,
wherein said initialization unit initializes said battery protection unit if a predetermined period elapses after said initialization unit transmits said initialization permission request but before said communication unit receives said initialization permission notification.

4. The battery system as set forth in claim 2,
wherein said charging/discharging management unit transmits said initialization permission notification in reply to said initialization permission request if said charging/discharging management unit receives said remaining capacity data from said communication unit.

5. The battery system as set forth in claim 1,
wherein said battery management unit includes:
a communication failure detection unit that detects a failure that occurs in communication between said battery management unit and said battery protection unit, and
wherein, if said failure occurs in the communication unit, said abnormal operation determination unit changes a signal level of a first contact signal that flows between said battery management unit and said battery protection unit, and
said abnormal operation determination unit determines that the abnormal operation occurs in said battery protection unit if a signal level of a second contact signal, that flows between said battery management unit and said battery protection unit, does not change after the signal level of said first contact signal changes and after a predetermined period elapses.

6. The battery system as set forth in claim 1,
wherein said battery management unit further includes:
a data storage unit that stores said remaining capacity data of said secondary battery that remains immediately before the abnormal operation occurs in said battery protection unit, and
wherein said communication unit transmits said remaining capacity data of said secondary battery that has been stored in said data storage unit to said charging/discharging management unit if the abnormal operation occurs in said battery protection unit.

7. A remaining capacity management method of a secondary battery for a battery system having a secondary battery; a battery control unit that controls charging and discharging of said secondary battery; and a charging/discharging management unit that controls the charging and discharging of said secondary battery through said battery control unit, the battery control unit having a battery protection unit that protects said secondary battery, and a battery management unit that controls the charging and discharging of said secondary battery through said battery protection unit, the battery management unit having an abnormal operatino determination unit and a communication unit, comprising:
if an abnormal operation occurs in the inner portion of said battery control unit, causing said battery control unit to transmit remaining capacity data that represent a remaining capacity of said secondary battery that remains immediately before the abnormal operation occurs,
wherein causing said battery control unit to transmit remaining capacity date comprises:
causing the abnormal operation determination unit to determine whether or not an abnormal operation occurs in said battery protection unit; and
causing a communication unit that, if the abnormal operation occurs in said battery protection unit, to transmit said remaining capacity data of said secondary battery, that remains immediately before the abnormal operation occurs, to said charging/discharging management unit.

* * * * *